United States Patent
Nakada

(10) Patent No.: US 9,608,861 B2
(45) Date of Patent: Mar. 28, 2017

(54) TRANSMISSION SYSTEM, ROUTING CONTROL DEVICE AND METHOD FOR CONTROLLING ROUTING

(75) Inventor: Tatsuhiro Nakada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 262 days.

(21) Appl. No.: 14/234,172

(22) PCT Filed: Jul. 19, 2012

(86) PCT No.: PCT/JP2012/004592
§ 371 (c)(1),
(2), (4) Date: Jan. 22, 2014

(87) PCT Pub. No.: WO2013/011689
PCT Pub. Date: Jan. 24, 2013

(65) Prior Publication Data
US 2014/0369181 A1 Dec. 18, 2014

(30) Foreign Application Priority Data
Jul. 19, 2011 (JP) .................. 2011-158299

(51) Int. Cl.
*H04L 12/24* (2006.01)
*H04L 12/721* (2013.01)
(Continued)

(52) U.S. Cl.
CPC ...... *H04L 41/0686* (2013.01); *H04L 41/0659* (2013.01); *H04L 45/22* (2013.01);
(Continued)

(58) Field of Classification Search
CPC ...... H04L 45/44; H04L 45/22; H04L 41/0686
See application file for complete search history.

(56) References Cited

U.S. PATENT DOCUMENTS 7,042,999 B2 * 5/2006 Goldstein .............. H04Q 3/005
379/220.01
2001/0019536 A1 * 9/2001 Suzuki ................ H04L 41/0654
370/226

(Continued)

FOREIGN PATENT DOCUMENTS

CN 1578273 A 2/2005
JP H7-250100 A 9/1995

(Continued)

OTHER PUBLICATIONS

Jitendra Padhye et al. "Modeling TCP Throughput: A Simple Model and its Empirical Validation", In Proc. ACM SIGCOMM, 1998, Department of Computer Science, University of Massachusetts, Amherst, MA 01003, USA.

(Continued)

*Primary Examiner* — Jenee Williams

(57) ABSTRACT

A first terminal-side routing control device 13 is placed between a first communication network 21 and a first communication terminal 11. A second terminal-side routing control device 15 is placed between a second communication network 22 and a second communication terminal 12. The first terminal-side routing control device 13 includes a first via information setting unit 14 for including, in data received from the first communication terminal 11, information for specifying a routing control device 33 placed on one side of a long-distance transmission path 23 as a via device. The second terminal-side routing control device 15 includes a second via information setting unit 16 for including, in data received from the second communication terminal 12, via information for specifying a routing control device 34 placed on the other side of the long-distance transmission path 23 as a via device.

7 Claims, 5 Drawing Sheets

(51) Int. Cl.
*H04L 12/707* (2013.01)
*H04L 29/06* (2006.01)
*H04L 29/14* (2006.01)

(52) U.S. Cl.
CPC .............. *H04L 45/34* (2013.01); *H04L 45/44* (2013.01); *H04L 69/08* (2013.01); *H04L 69/40* (2013.01)

(56) References Cited

U.S. PATENT DOCUMENTS

| | | | | |
|---|---|---|---|---|
| 2007/0195702 | A1* | 8/2007 | Yuen | H04L 45/121 370/238 |
| 2008/0043976 | A1* | 2/2008 | Maximo | H04L 45/00 379/220.01 |
| 2008/0056138 | A1 | 3/2008 | Saitoh | |
| 2008/0205613 | A1* | 8/2008 | Lopez | G06Q 10/0635 379/114.02 |
| 2008/0317237 | A1* | 12/2008 | Lozano et al. | 370/360 |
| 2010/0296646 | A1* | 11/2010 | Hemm | G06Q 10/107 379/265.02 |
| 2012/0246282 | A1* | 9/2012 | Oguchi | 709/221 |

FOREIGN PATENT DOCUMENTS

| | | |
|---|---|---|
| JP | 2002-368787 A | 12/2002 |
| JP | 2008-61047 A | 3/2008 |
| JP | 2009-224947 A | 10/2009 |
| WO | 2011/037245 A1 | 3/2011 |

OTHER PUBLICATIONS

International Search Report for PCT Application No. PCT/JP2012/004592, mailed on Aug. 28, 2012.
Chinese Office Action for CN Application No. 201280035863.1 mailed on Sep. 30, 2015 with English Translation.

* cited by examiner

TRANSMISSION SYSTEM, ROUTING CONTROL DEVICE AND METHOD FOR CONTROLLING ROUTING

TECHNICAL FIELD

The present invention relates to a transmission system in which a first communication terminal and a second communication terminal that perform bidirectional communication are communicably connected via a first communication network, a long-distance transmission path, and a second communication network, and to a routing control device and a method for controlling routing.

BACKGROUND ART

TCP/IP is widely used as a connection-oriented communication protocol between communication terminals. In the case of using TCP/IP in a network with high latency, congestion control of TCP/IP causes a decrease in throughput. The TCP/IP communication throughput depends on an RTT (Round Trip Time), which is latency in a network between a sender and a receiver, and a packet loss rate. The TCP/IP communication throughput is substantially inversely proportional to the RTT and inversely proportional to the square root of the packet loss rate. In detail, the TCP/IP communication throughput is expressed by the following model equation described in Non Patent Literature (NPL) 1.

[Math. 1]

$$B(p) \approx \min\left(\frac{W \max}{RTT}, \frac{1}{RTT\sqrt{\frac{2bp}{3}} + T_0\min\left(1, 3\sqrt{\frac{3bp}{8}}\right)p(1+32p^2)}\right) \quad \text{Equation (1)}$$

In Equation (1), "B" denotes the number of packets per unit time, "W" denotes the maximum window size (typically about 8 to 200 packets) in TCP, "RTT" denotes the RTT when a packet travels from one terminal to the other terminal and back again, "p" denotes the packet loss rate, "T0" denotes the retransmission timeout period (typically 1 second), and "b" denotes the number of ACKs (typically 2) combined according to TCP's delayed ACK option.

To improve the TCP/IP communication throughput, window control algorithms such as TCP Tahoe, TCP Reno, and TCP SACK are proposed. Window control algorithms for long-distance high-speed transmission, such as High Speed TCP, are proposed, too.

In a long-distance system such as a submarine cable system, a signal is transmitted with a strong error correction code such as FEC (Forward Error Correction) being added thereto. Accordingly, when an appropriate transmission path is designed, code errors are mostly negligible. However, transmission path delays due to optical fibers or repeaters can incur high latency and decrease the TCP/IP communication throughput.

If a physical interface is low-speed, the decrease of the TCP/IP communication throughput caused by latency is not apparent in the transmission path. As a result of significant improvements in physical interface speed, however, the decrease of the TCP/IP communication throughput forms a bottleneck in the transmission path. In a long-distance system such as a submarine cable system, too, the decrease of the TCP/IP throughput caused by latency in the transmission path can be a bottleneck.

Patent Literature (PTL) 1 describes a system for improving the TCP/IP communication throughput by performing protocol conversion to separate a protocol in a submarine cable segment and a protocol in a land transmission network submarine cable segment 601.

PTL 2 describes a device capable of realizing quick path switching without overhead or processing delay, reconstructing an alternate path to bypass a specific congested link, and relaying traffic in a distributed manner in an entire network.

CITATION LIST

Patent Literatures

PTL 1: International Patent Application Publication No. WO2011/037245

PTL 2: Japanese Patent Application Laid-Open No. 2002-368787

Non Patent Literature

NPL 1: J. Padhye, V. Firoiu, D. Towsley, J. Kurose, Modeling TCP Throughput: A Simple Model and its Empirical Validation, In Proc. ACM SIGCOMM, 1998

SUMMARY OF INVENTION

Technical Problem

In the system described in PTL 1, traffic sent and received between communication terminals that perform TCP/IP communication is required to be protocol converted through the same protocol converters in both directions. FIG. 5 is a system diagram depicting an example of a structure of a transmission system in which communication terminals perform communication via protocol converters. As depicted in FIG. 5, in the case where communication terminals 701 and 702 connected to land transmission networks 901 and 902 communicate with each other, traffic in the direction of the communication terminal 701—the communication terminal 702 and traffic in the direction of the communication terminal 702→the communication terminal 701 are both transmitted via a submarine cable segment 1001 (segment between transponders 801 and 802) at both ends of which protocol converters 811 and 812 are placed. In a typical Internet environment, on the other hand, communication is usually performed with the use of a plurality of paths for traffic diversion in the event of a network failure or for load distribution. It is therefore not ensured that traffic is sent and received through the same path. In order to realize the system described in PTL 1, it is preferable to design such a network that can ensure that traffic is sent and received between the communication terminals via the protocol converters.

The device described in PTL 2 does not ensure that traffic is sent and received through the same path in the case where an alternate path for bypassing a congested link is reconstructed.

Accordingly, the present invention has an exemplary object of providing a transmission system, a routing control device and a method for controlling routing with which traffic sent and received between communication terminals can be transmitted through a designated path.

Solution to Problem

A transmission system according to the present invention is a transmission system in which a first communication terminal and a second communication terminal that perform bidirectional communication are communicably connected via a first communication network, a long-distance transmission path, and a second communication network, wherein protocol converters and routing control devices are placed on both sides of the long-distance transmission path, wherein a first terminal-side routing control device is placed between the first communication network and the first communication terminal, wherein a second terminal-side routing control device is placed between the second communication network and the second communication terminal, wherein the first terminal-side routing control device includes a first via information setting unit for including, in data received from the first communication terminal, information for specifying a routing control device placed on one side of the long-distance transmission path as a via device, and wherein the second terminal-side routing control device includes a second via information setting unit for including, in data received from the second communication terminal, via information for specifying a routing control device placed on the other side of the long-distance transmission path as a via device.

A routing control device according to the present invention is a routing control device in a transmission system in which a first communication terminal and a second communication terminal that perform bidirectional communication are communicably connected via a first communication network, a long-distance transmission path, and a second communication network and protocol converters and routing control devices are placed on both sides of the long-distance transmission path, the routing control device being placed between the first communication network and the first communication terminal or between the second communication network and the second communication terminal, the routing control device including a via information setting unit for including, in data received from a communication terminal, information for specifying a routing control device placed on a side of the long-distance transmission path as a via device.

A method for controlling routing according to the present invention is a method for controlling routing executed in a transmission system in which a first communication terminal and a second communication terminal that perform bidirectional communication are communicably connected via a first communication network, a long-distance transmission path, and a second communication network and protocol converters and routing control devices are placed on both sides of the long-distance transmission path, the method for controlling routing including: including, in data received from a communication terminal, information for specifying a routing control device placed on a side of the long-distance transmission path as a via device.

Advantageous Effects of Invention

According to the present invention, traffic sent and received between communication terminals can be transmitted through a designated path.

DESCRIPTION OF EMBODIMENTS

Exemplary Embodiment 1

The following describes Exemplary Embodiment 1 of the present invention with reference to drawings.

Figure 1:
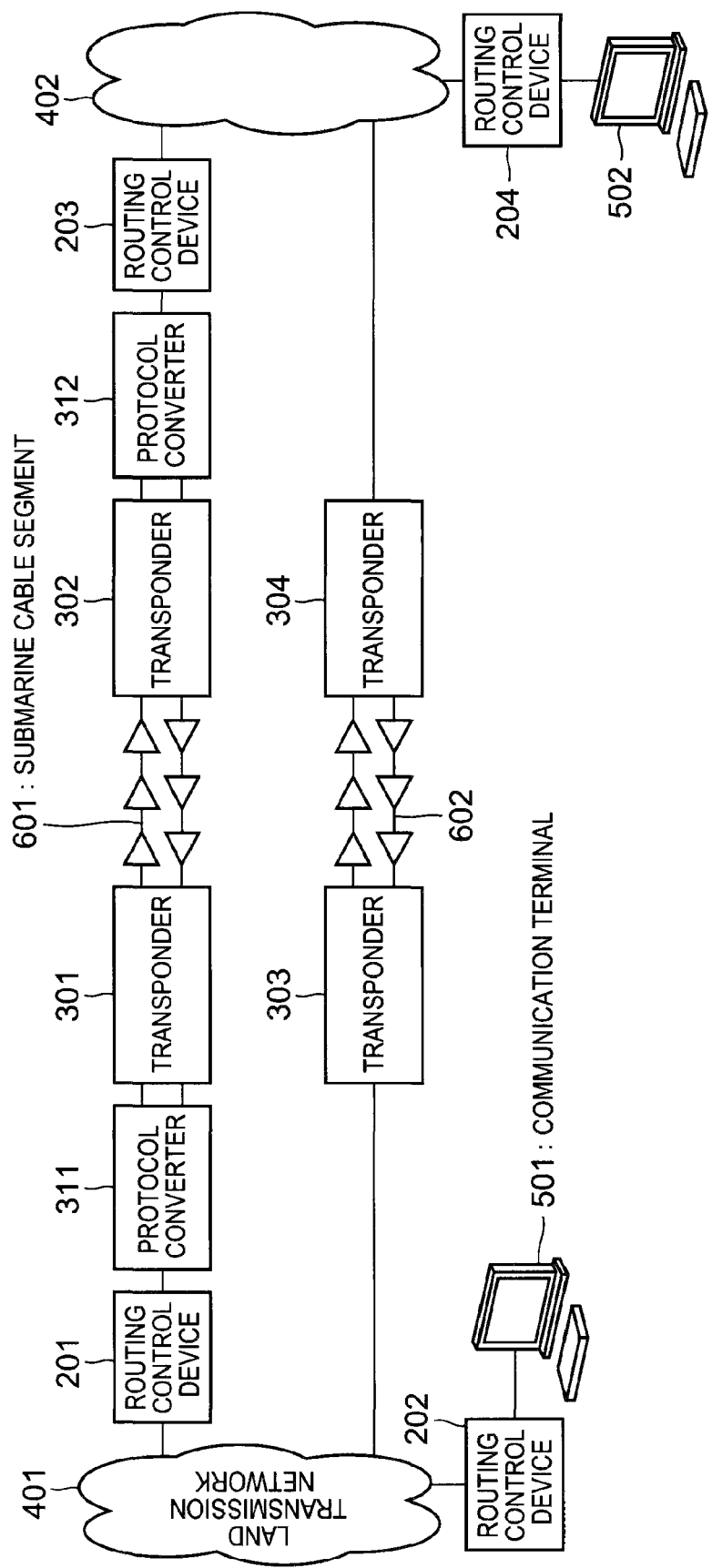
FIG. 1 It is a system diagram depicting an example of a structure of a transmission system including a routing control device according to the present invention.
Figure 2:
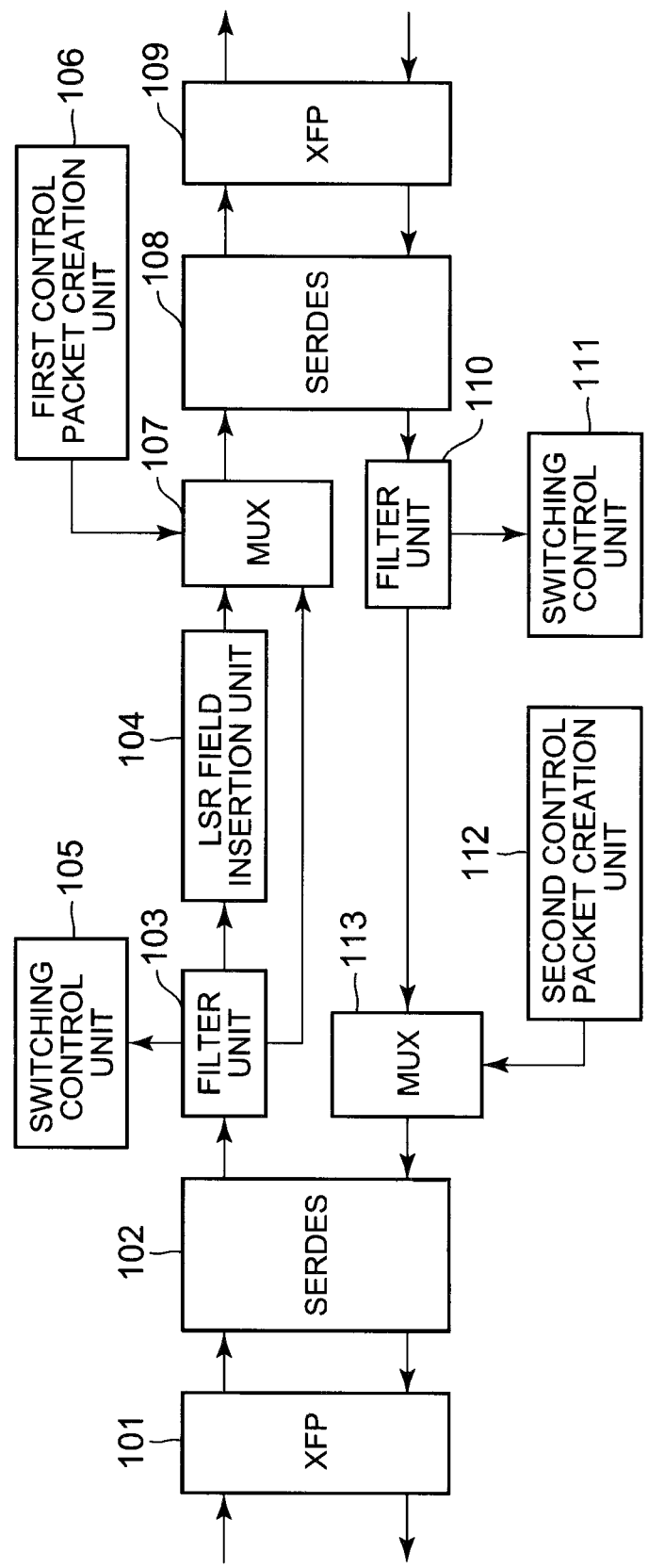
FIG. 2 It is a block diagram depicting a structure of the routing control device according to the present invention.

FIG. 1 is a system diagram depicting an example of a structure of a transmission system including a routing control device according to the present invention. FIG. 2 is a block diagram depicting a structure of the routing control device according to the present invention.

An example where, in the transmission system depicted in FIG. 1, traffic sent and received between communication terminals that perform bidirectional communication is transmitted via routing control devices is described in this exemplary embodiment.

In the transmission system depicted in FIG. 1, transponders 301 to 304 are each an optical signal sender-receiver. Many repeaters are placed in a submarine cable segment 601. The submarine cable segment 601 is an example of a long-distance transmission path. The submarine cable segment 601 has a long data transmission distance, when compared with land transmission networks 401 and 402. That is, the submarine cable segment 601 as a long-distance transmission path corresponds to a network with high latency, when compared with the land transmission network 401 as a first communication network and the land transmission network 402 as a second communication network.

In the transmission system depicted in FIG. 1, protocol converters 311 and 312 are the same converters as the protocol converter described in PTL 1. The protocol converters 311 and 312 send and receive traffic using a protocol different from the TCP/IP protocol, in the submarine cable segment 601.

TCP/IP is used as a protocol in the land transmission networks 401 and 402. Signal transmission using FEC is typically performed in the submarine cable segment 601. The possibility that a signal error occurs in the submarine cable segment 601 is therefore low. Accordingly, for example, the protocol converter 311 sends a TCP/IP frame to the submarine cable segment 601 side and then, before receiving an ACK signal from the submarine cable segment 601 side, sends an ACK signal to the land transmission network 401 side. The protocol converter 312 sends a TCP/IP frame to the submarine cable segment 601 side and then, before receiving an ACK signal from the submarine cable segment 601 side, sends an ACK signal to the land transmission network 402 side. The TCP/IP communication throughput in the submarine cable segment 601 is improved by each of the protocol converters 311 and 312 sending an ACK signal to the land transmission network side before actually receiving an ACK signal.

Note that protocol conversion is not limited to conversion relating to window control for ACK signals. The protocol converters 311 and 312 may use other protocol conversion so long as the TCP/IP communication throughput is improved.

Since protocol conversion is performed before and after the submarine cable segment 601, sent traffic and received traffic are both required to pass through the protocol converters 311 and 312.

Hence, in this exemplary embodiment, routing control devices 201 and 203 are placed between the submarine cable segment 601 and the land transmission networks 401 and 402. Meanwhile, a routing control device 202 is placed between a communication terminal 501 and the land transmission network 401, and a routing control device 204 is placed between a communication terminal 502 and the land transmission network 402.

Each of the routing control devices 201 to 204, in the case where a received packet is a packet to be routing controlled, adds an LSR field to an option field in an IP header of the packet. In this exemplary embodiment, traffic sent and received between the communication terminals 501 and 502 via the protocol converters 311 and 312 is traffic to be routing controlled.

Each of the routing control devices 201 to 204 sets the IP address of the routing control device on the opposite side of the land transmission network, in path information in the LSR field. For example, the routing control device 201 designates the IP address of the routing control device 202 in the path information. Likewise, the routing control device 202 designates the IP address of the routing control device 201 in the path information. Moreover, the routing control devices 203 and 204 each add the LSR field in which the IP address of the other device is set in the path information, to the option field in the IP header. This ensures that traffic to be routing controlled is transmitted via the routing control devices directly connected to the protocol converters. In other words, sent traffic and received traffic to be routing controlled are both communicated via the submarine cable segment 601 at both ends of which the protocol converters 311 and 312 are placed.

Each of the routing control devices 201 and 202 which are opposite to each other with the land transmission network 401 in between sends failure information held in the device to the other device. Likewise, each of the routing control devices 203 and 204 sends failure information held in the device to the other device. Each of the routing control devices 201 and 203 which are opposite to each other with the submarine cable in between sends failure information held in the device to the other device. Each of the routing control devices 201 to 204 detects a failure in the submarine cable segment 601 and the land transmission networks 401 and 402, based on the failure information. Upon detecting the failure, each of the routing control devices 201 to 204 stops path control using the LSR field, and attempts to communicate traffic by an alternate path.

Each of the routing control devices 201 to 204 is configured as depicted in FIG. 2. Note that the routing control devices 202 and 204 may each have only packet routing-related functions without multiplexing-related functions.

The routing control device depicted in FIG. 2 includes an XFP 101, a SERDES (Serializer/Deserializer) 102, a filter unit 103, an LSR (Loose Source Routing) field insertion unit 104, a switching control unit 105, a first control packet creation unit 106, a MUX 107, a SERDES 108, an XFP 109, a filter unit 110, a switching control unit 111, a second control packet creation unit 112, and a MUX 113.

The XFP 101 is an XFP (10 Gigabit Small Form-factor Pluggable) transceiver placed on the submarine cable side or the communication terminal side as a submarine cable-side interface or a communication terminal-side interface. The XFP 101 receives a 10 gigabit (10 G) Ethernet® signal sent from the submarine cable side or the communication terminal side. The XFP 101 also outputs a 10 G serial signal received from the SERDES 102, to the submarine cable side or the communication terminal side.

The XFP 109 is an XFP transceiver placed on the land transmission network side as a land transmission network-side interface. The XFP 109 outputs a 10 G serial signal received from the SERDES 108, to the land transmission network side. The XFP 109 also receives a 10 G Ethernet signal sent from the land transmission network side.

The SERDES 102 converts a 10 G serial signal received from the XFP 101 to a parallel signal, and outputs the parallel signal to the filter unit 103. The SERDES 102 also converts a 10 G parallel signal received from the MUX 113 to a serial signal, and outputs the serial signal to the XFP 101.

The filter unit 103 identifies the signal received from the SERDES 102, as a control packet, a packet to be routing controlled, or a packet not to be routing controlled. The filter unit 103 outputs the control packet to the switching control unit 105, the packet to be routing controlled to the LSR field insertion unit 104, and the packet not to be routing controlled to the MUX 107.

The LSR field insertion unit 104 adds an LSR field defined in RFC 791, to an option field of the received packet to be routing controlled.

The switching control unit 105 monitors a control packet sent from the opposite routing control device (opposite station) on the submarine cable side. In the case where a control packet has not been received for a predetermined period, the switching control unit 105 determines that the opposite station or the transmission path has a failure. The switching control unit 105 accordingly stops the LSR field insertion process by the LSR field insertion unit 104.

The first control packet creation unit 106 periodically outputs a control packet to be sent to the opposite station on the land transmission network side, to the MUX 107. Moreover, in the case where a failure is detected in this routing control device or the routing control device on the submarine cable side, the first control packet creation unit 106 outputs failure information for notifying the failure to the opposite station on the land transmission network side, to the MUX 107.

The MUX 107 multiplexes the packet to be routing controlled received from the LSR field insertion unit 104, the packet not to be routing controlled received from the filter unit 103, and the control packet and the failure information received from the first control packet creation unit 106, and outputs the multiplexed signal to the SERDES 108 as a 10 G parallel signal.

The SERDES 108 converts the 10 G parallel signal received from the MUX 107, to a serial signal.

The filter unit 110 identifies a signal received from the SERDES 108, as a control packet or a packet other than the control packet. The filter unit 110 outputs the control packet to the switching control unit 111, and the other packet to the MUX 113. In the case where the LSR field to this routing control device is inserted in the IP header of the received packet, the filter unit 110 terminates the relay by the path information in the LSR field.

The switching control unit 111 monitors a control packet sent from the opposite routing control device on the land transmission network side. In the case where a control packet has not been received for a predetermined period, the switching control unit 111 determines that the opposite station or the transmission path has a failure.

The second control packet creation unit 112 periodically outputs a control packet to be sent to the opposite station on the submarine cable side, to the MUX 113. Moreover, in the case where a failure is detected in this routing control device or the routing control device on the land transmission network side, the second control packet creation unit 112 outputs failure information for notifying the failure to the opposite station on the submarine cable side, to the MUX 113.

The MUX 113 multiplexes the packet received from the filter unit 110 and the control packet and the failure information received from the second control packet creation unit 112, and outputs the multiplexed signal to the SERDES 102 as a 10 G parallel signal.

The following describes an operation of each routing control device in the case where traffic is transmitted from the communication terminal 501 to the communication terminal 502.

Each of the routing control devices 201 to 204 stores the IP addresses of the communication terminals 501 and 502 in a storage unit (not depicted) as a routing controlled object condition beforehand, in order to subject traffic sent and received between the communication terminals 501 and 502 to routing control.

A packet sent from the communication terminal 501 is received by the XFP 101 in the routing control device 202. The packet received by the XFP 101 in the routing control device 202 is supplied to the SERDES 102 in the routing control device 202. The SERDES 102 converts the packet to a 10 G parallel signal.

The filter unit 103 in the routing control device 202 determines that the received packet is to be routing controlled, in the case where a source address and a destination address of the received packet match the addresses in the routing controlled object condition.

In the case where the packet is not to be routing controlled, the filter unit 103 outputs the packet to the MUX 107. In the case where the packet is to be routing controlled, the filter unit 103 outputs the packet to the LSR field insertion unit 104. The LSR field insertion unit 104 sets, in the path information in the LSR field of the received packet, the IP address of the routing control device 201 as information for specifying a via device through which the packet is transmitted, and outputs the packet to the MUX 107. The MUX 107 multiplexes the received packet, a control packet, and the like. The SERDES 108 serial converts the multiplexed signal, and outputs the serial converted signal to the XFP 109. The XFP 109 outputs the serial converted signal to the land transmission network 401.

The packet output to the land transmission network 401 is transmitted through a router in the land transmission network 401. In detail, the packet output to the land transmission network 401 is transmitted to the routing control device 201, based on the path information in the LSR field set by the routing control device 202.

The XFP 109 in the routing control device 201 receives the packet sent from the routing control device 202. The packet received by the XFP 109 is parallel converted by the SERDES 108, and then supplied to the filter unit 110.

In the case where the received packet is a packet other than a control packet, the filter unit 110 outputs the packet to the MUX 113. The packet output to the MUX 113 is then serial converted by the SERDES 102, and output from the XFP 101 to the submarine cable segment 601 via the protocol converter 311 and the transponder 301.

The packet output from the routing control device 201 is transmitted via the submarine cable segment 601. The packet is then received by the XFP 101 which is the submarine cable-side interface of the routing control device 203, via the transponder 302 and the protocol converter 312.

The routing control device 203 sets the IP address of the routing control device 204 in the path information in the LSR field of the packet to be routing controlled, and outputs the packet to the land transmission network 402. The packet output to the land transmission network 402 is transmitted to the routing control device 204, based on the path information in the LSR field set by the routing control device 203.

Since the LSR field to the routing control device 204 is inserted in the IP header of the received packet, the routing control device 204 terminates the relay by the path information in the LSR field. That is, the routing control device 204 transfers the received packet to the communication terminal 502, without setting the path information in the LSR field of the received packet.

Traffic from the communication terminal 502 to the communication terminal 501 is equally transmitted via the submarine cable segment 601. In detail, the LSR field insertion unit 104 in the routing control device 204 sets, in the path information in the LSR field of the packet sent from the communication terminal 502, the IP address of the routing control device 203 as information for specifying a via device. As a result, the packet reaches the routing control device 203 connected to the protocol converter 312.

The packet output from the routing control device 203 is transmitted via the submarine cable segment 601. The packet is then received by the XFP 101 which is the submarine cable-side interface of the routing control device 201, via the transponder 301 and the protocol converter 311.

The routing control device 201 sets the IP address of the routing control device 202 in the path information in the LSR field of the packet to be routing controlled, and outputs the packet to the land transmission network 401. The packet output to the land transmission network 401 is transmitted to the routing control device 202, based on the path information in the LSR field set by the routing control device 201.

Figure 5:
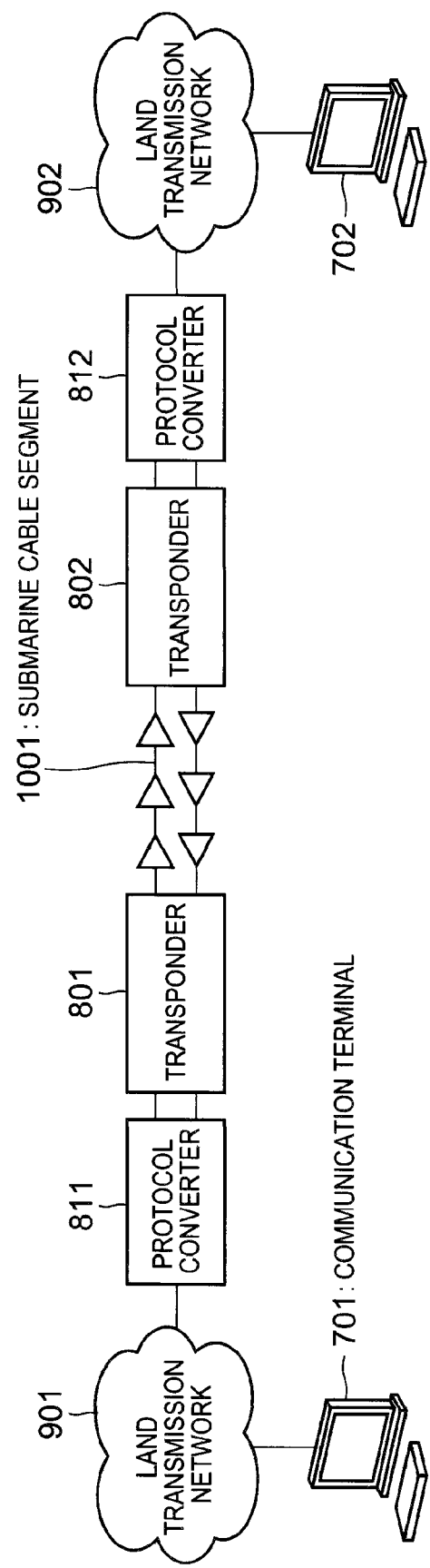
FIG. 5 It is a system diagram depicting an example of a structure of a transmission system in which communication is performed via protocol converters.

As described above, in this exemplary embodiment, traffic to be routing controlled can be transmitted through the path set in the path information in the LSR field. Therefore, in the transmission system including the submarine cable segment as depicted in FIG. 5, bidirectional traffic to be protocol converted can be transmitted through the path in which the protocol converters are placed.

Though the LSR field added to the IP header is used for path control in this exemplary embodiment, "Type 0 Routing header" defined in RFC 2460 may be used for path control in the case where the communication protocol is IPv6 (Internet Protocol version 6).

The following describes an operation of each routing control device in the case where a failure occurs in the land transmission network 401.

The routing control device 202 sends a control packet periodically created by the first control packet creation unit 106, to the routing control device 201.

The switching control unit 111 in the routing control device 201 monitors the control packet sent from the routing control device 202. When the reception of the control packet stops due to the failure in the land transmission network 401, the switching control unit 111 determines that a path failure has occurred. When the path failure is determined, the second control packet creation unit 112 creates failure information, and sends the created failure information to the routing control device 203.

The switching control unit 105 in the routing control device 203 stops the LSR field insertion process by the LSR field insertion unit 104, when the failure information is received from the routing control device 201. The routing control device 203 transfers the received failure information to the routing control device 204.

The LSR field insertion unit 104 in the routing control device 204 stops the LSR field insertion process to a packet sent from the communication terminal 502, when the failure information transferred from the routing control device 203 is received.

The routing control device 202 determines that a path failure has occurred, as the reception of a control packet periodically sent from the routing control device 201 stops. When the path failure is determined, the LSR field insertion unit 104 stops the LSR field insertion process to a packet sent from the communication terminal 501. As a result, the LSR field insertion process is stopped in all of the routing control devices 201 to 204.

In this exemplary embodiment, in the case where a failure occurs in the opposite station or the transmission path, the LSR field insertion process is stopped in all routing control devices. This allows traffic between the communication terminals 501 and 502 to be diverted to a path, such as a submarine cable segment 602, other than the submarine cable segment 601 which is the designated path.

Though the filter unit 103 determines whether or not the received packet is to be routing controlled based on the IP addresses of the communication terminals 501 and 502, the determination may be made by other methods. For instance, in the case where a specific service is subject to routing control, the filter unit 103 may determine whether or not the received packet is to be routing controlled based on a port number in a TCP header of the packet.

Exemplary Embodiment 2

The following describes Exemplary Embodiment 2 of the present invention with reference to drawings.

Figure 3:
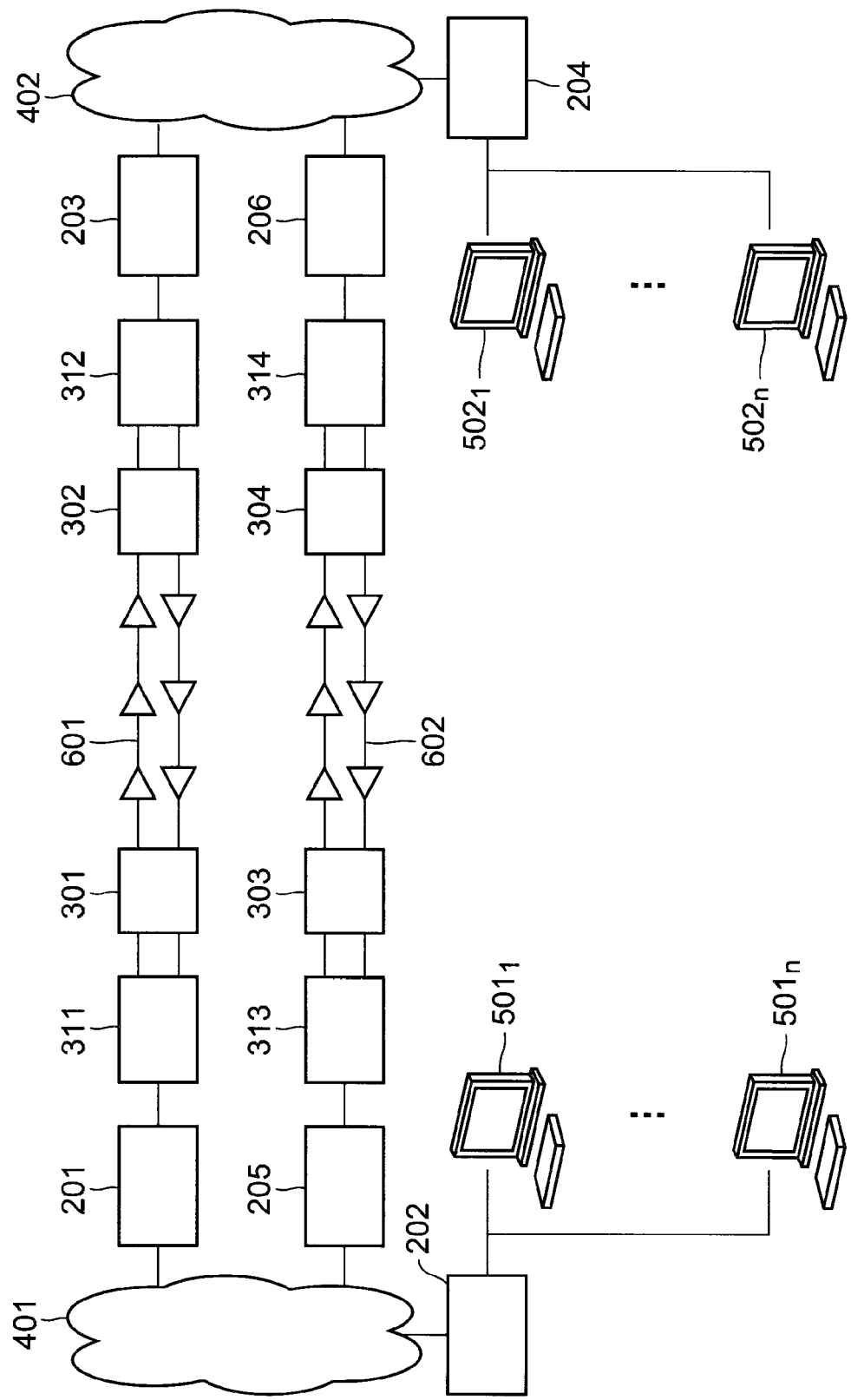
FIG. 3 It is a system diagram depicting another example of the structure of the transmission system including the routing control device according to the present invention.

FIG. 3 is a system diagram depicting another example of the transmission system including the routing control device according to the present invention.

Routing control devices 205 and 206 depicted in FIG. 3 have the same structure as the routing control devices 201 to 204 depicted in FIG. 2.

As depicted in FIG. 3, each of the submarine cable segments 601 and 602 at both ends of which protocol converters are placed is present between the land transmission networks 401 and 402. Note that there may be any number of submarine cable segments at both ends of which protocol converters are placed. Communication terminals $501_1$ to $501_n$ are connected to the routing control device 202, and communication terminals $502_1$ to $502_n$ are connected to the routing control device 204.

In the case where a plurality of routing control devices are opposite to the routing control device 202 with the land transmission network in between, the LSR field insertion unit 104 in the routing control device 202 sets the IP address of any of the routing control devices 201 and 205, in the path information in the LSR field of a packet sent from each of the communication terminals $501_1$ to $501_n$.

In the case where a plurality of routing control devices are opposite to the routing control device 204 with the land transmission network in between, the LSR field insertion unit 104 in the routing control device 204 sets the IP address of any of the routing control devices 203 and 206, in the path information in the LSR field of a packet sent from each of the communication terminals $502_1$ to $502_n$.

For example, in the case where a path failure occurs in the submarine cable segment 601, in the routing control device 202 receiving the failure information from the routing control device 201, the LSR field insertion unit 104 designates the IP address of the routing control device 205 in the path information in the LSR field. After this, traffic is transmitted via the submarine cable segment 602.

In this exemplary embodiment, even when a path failure occurs in one submarine cable segment, traffic can be diverted to another submarine cable segment having no path failure. This enables signal communication to be continued.

Moreover, in the case where a plurality of submarine cable segments communicate normally, each of the routing control devices 202 and 204 switches the routing control information designated in the LSR field, with it being possible to distribute the load of traffic transmitted through each submarine cable segment. As an example, the LSR field insertion unit 104 in the routing control device 202 designates the routing control device 201 in the path information in the LSR field for traffic whose source communication terminal has an odd IP address, and designates the routing control device 205 in the path information in the LSR field for traffic whose source communication terminal has an even IP address.

Figure 4:
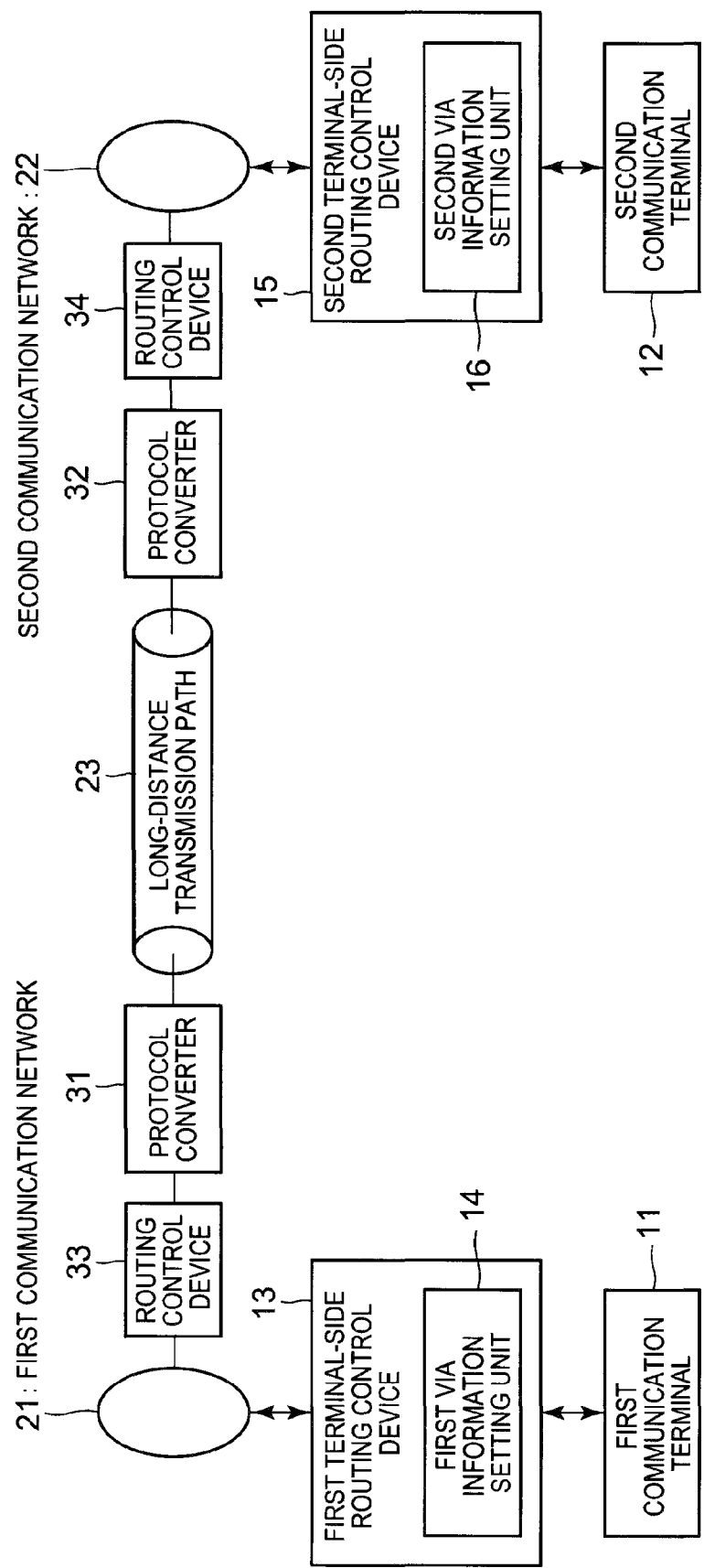
FIG. 4 It is a block diagram depicting main parts of the routing control device according to the present invention.

FIG. 4 is a block diagram depicting main parts of the transmission system according to the present invention. As depicted in FIG. 4, protocol converters 31 and 32 (e.g. the protocol converters 311 and 312 depicted in FIG. 1) and routing control devices 33 and 34 (e.g. the routing control devices 201 and 203 depicted in FIG. 1) are placed on both sides of a long-distance transmission path 23 (e.g. the submarine cable segment 601 depicted in FIG. 1). A first terminal-side routing control device 13 (e.g. the routing control device 202 depicted in FIG. 1) is placed between a first communication network 21 (e.g. the land transmission network 401 depicted in FIG. 1) and a first communication terminal 11 (e.g. the communication terminal 501 depicted in FIG. 1). A second terminal-side routing control device 15 (e.g. the routing control device 204 depicted in FIG. 1) is placed between a second communication network 22 (e.g. the land transmission network 402 depicted in FIG. 1) and a second communication terminal 12 (e.g. the communication terminal 502 depicted in FIG. 1). The first terminal-side routing control device 13 includes a first via information setting unit 14 (e.g. the LSR field insertion unit 104 depicted in FIG. 2) for including, in data received from the first communication terminal 11, information for specifying the routing control device 33 placed on one side of the long-distance transmission path 23 as a via device. The second terminal-side routing control device 15 includes a second via information setting unit 16 (e.g. the LSR field insertion unit 104 depicted in FIG. 2) for including, in data received from the second communication terminal 12, via information for specifying the routing control device 34 placed on the other side of the long-distance transmission path 23 as a via device.

The following transmission systems are also disclosed in the above exemplary embodiments.

(1) The transmission system wherein the first terminal-side routing control device 13 stores specification information (e.g. the addresses as the routing controlled object condition) that enables specification of whether or not to include the via information in the data, wherein the first via information setting unit 14 includes the via information (e.g. the path information in the LSR field) in the data (e.g. the received packet whose source address and destination address match the routing controlled object condition) specified by the stored specification information, wherein the second terminal-side routing control device 15 stores specification information (e.g. the addresses as the routing controlled object condition) that enables specification of whether or not to include the via information in the data, and wherein the second via information setting unit 16 includes the via information (e.g. the path information in the LSR field) in the data (e.g. the received packet whose source address and destination address match the routing controlled object condition) specified by the stored specification information.

(2) The transmission system wherein the routing control device 33 placed on one side of the long-distance transmission path 23 sends anomaly information to the second terminal-side routing control device 15 via the routing control device 34 placed on the other side of the long-distance transmission path 23, in the case where an anomaly of the first communication network 21 is detected, wherein the second via information setting unit 16 in the second terminal-side routing control device 15 stops a process (e.g. the LSR field insertion process) of including the information for specifying the via device in the data received from the second communication terminal 12, in the case where the anomaly information is received, and wherein the first via information setting unit 14 in the first terminal-side routing control device 13 stops a process (e.g. the LSR field insertion process) of including the information for specifying the via device in the data received from the first communication terminal 11, in the case where an occurrence of an anomaly is detected.

(3) The transmission system wherein a second long-distance transmission path (e.g. the submarine cable segment 602 depicted in FIG. 3) is provided, wherein protocol converters and routing control devices (e.g. the protocol converters 313 and 314 and the routing control devices 205 and 206 depicted in FIG. 3) are placed on both sides of the second long-distance transmission path, wherein the first terminal-side routing control device includes, in the data received from the first communication terminal, information for specifying the routing control device placed on one side of the long-distance transmission path or the routing control device placed on one side of the second long-distance transmission path as the via device, and wherein the second terminal-side routing control device includes, in the data received from the second communication terminal, information for specifying the routing control device placed on the other side of the long-distance transmission path or the routing control device placed on the other side of the second long-distance transmission path as the via device.

Though the present invention has been described with reference to the above exemplary embodiments and examples, the present invention is not limited to the above exemplary embodiments and examples. Various changes understandable by those skilled in the art can be made to the structures and details of the present invention within the scope of the present invention.

This application claims priority based on Japanese Patent Application No. 2011-158299 filed on Jul. 19, 2011, the disclosure of which is incorporated herein in its entirety.

REFERENCE SIGNS LIST

11 first communication terminal
12 second communication terminal
13 first terminal-side routing control device
14 first via information setting unit
15 second terminal-side routing control device
16 second via information setting unit
21 first communication network
22 second communication network
23 long-distance transmission path
31, 32 protocol converter
33, 34 routing control device
101, 109 XFP
102, 108 SERDES
103, 110 filter unit
104 LSR field insertion unit
105, 111 switching control unit
106, 112 control packet creation unit
107, 113 MUX
201 to 206 routing control device
301 to 304, 801, 802 transponder
311 to 314, 811, 812 protocol converter
401, 402, 901, 902 land transmission network
501, 502, 501$_1$ to 501$_n$, 502$_1$ to 502$_n$, 701, 702 communication terminal
601, 602, 1001 submarine cable segment

What is claimed is:

1. A transmission system comprising:
    a first communication terminal and a second communication terminal that perform bidirectional communication communicably connected via a first communication network, a long-distance transmission path, and a second communication network; and
    protocol converters and routing control devices on both sides of the long-distance transmission path,
        wherein a first terminal-side routing control device is placed between the first communication network and the first communication terminal,
        wherein a second terminal-side routing control device is placed between the second communication network and the second communication terminal,
        wherein the first terminal-side routing control device comprises a first via information setting unit for adding, to data received from the first communication terminal, information for specifying a routing control device placed on one side of the long-distance transmission path as a via device and a first transmission unit for transmitting the data including the information to a routing control device specified by the information via the first communication network, and
        wherein the second terminal-side routing control device comprises a second via information setting unit for adding, to data received from the second communication terminal, via information for specifying a routing control device placed on an other side of the long-distance transmission path as a via device and a second transmission unit for transmitting the data including the via information to a routing control device specified by the via information via the second communication network.

2. The transmission system according to claim 1, wherein the first terminal-side routing control device stores specification information that enables specification of whether or not to add the via information to the data,
    wherein the first via information setting unit adds the via information to the data specified by the stored specification information, wherein the second terminal-side routing control device stores specification information that enables specification of whether or not to add the via information to the data, and wherein the second via information setting unit adds the via information to the data specified by the stored specification information.

3. The transmission system according to claim 2, wherein the routing control device placed on one side of the long-distance transmission path sends anomaly information to the second terminal-side routing control device via the routing control device placed on the other side of the long-distance transmission path, in the case where an anomaly of the first communication network is detected, wherein the second via information setting unit in the second terminal-side routing control device stops a process of adding the information for specifying the via device in the data received from the second communication terminal, in the case where the anomaly information is received, and wherein the first via information setting unit in the first terminal-side routing control device stops a process of adding the information for specifying the via device in the data received from the first communication terminal, in the case where an occurrence of an anomaly is detected.

4. The transmission system according to claim 1, wherein the routing control device placed on one side of the long-distance transmission path sends anomaly information to the second terminal-side routing control device via the routing control device placed on the other side of the long-distance transmission path, in a case where an anomaly of the first communication network is detected, wherein the second via information setting unit in the second terminal-side routing control device stops a process of adding the information for specifying the via device in the data received from the second communication terminal, in the case where the anomaly information is received, and wherein the first via information setting unit in the first terminal-side routing control device stops a process of adding the information for specifying the via device in the data received from the first communication terminal, in the case where an occurrence of an anomaly is detected.

5. The transmission system according to claim 1, wherein a second long-distance transmission path is provided, wherein protocol converters and routing control devices are placed on both sides of the second long-distance transmission path, wherein the first terminal-side routing control device adds, to the data received from the first communication terminal, information for specifying the routing control device placed on one side of the long-distance transmission path or a routing control device placed on one side of the second long-distance transmission path as the via device, and wherein the second terminal-side routing control device adds, to the data received from the second communication terminal, information for specifying the routing control device placed on the other side of the long-distance transmission path or a routing control device placed on the other side of the second long-distance transmission path as the via device.

6. The transmission system according to claim 1, wherein the first communication network is a land transmission network, wherein the long-distance transmission path is a submarine cable segment, and wherein the second communication network is a land transmission network.

7. The transmission system according to claim 1, wherein when receiving a control packet periodically sent from a routing control device, the first via information setting unit adds, to data received from the first communication terminal, via information for specifying the routing control device which sends the control packet as a via device.

* * * * *